US009607031B2

(12) United States Patent
Lu et al.

(10) Patent No.: US 9,607,031 B2
(45) Date of Patent: Mar. 28, 2017

(54) SOCIAL DATA FILTERING SYSTEM, METHOD AND NON-TRANSITORY COMPUTER READABLE STORAGE MEDIUM OF THE SAME

(71) Applicant: INSTITUTE FOR INFORMATION INDUSTRY, Taipei (TW)

(72) Inventors: Chun-Hung Lu, Taipei (TW); Yi-Hsung Li, Taichung (TW); Wen-Tai Hsieh, Taipei (TW); Tai-Hung Chen, New Taipei (TW); Yu-Chi Chang, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 209 days.

(21) Appl. No.: 14/281,912

(22) Filed: May 20, 2014

(65) Prior Publication Data

US 2014/0372459 A1    Dec. 18, 2014

(30) Foreign Application Priority Data

Jun. 18, 2013    (TW) .............................. 102121561 A

(51) Int. Cl.
G06F 17/30    (2006.01)
(52) U.S. Cl.
CPC .............................. *G06F 17/30345* (2013.01)
(58) Field of Classification Search
CPC .................... G06F 17/30345; G06F 17/30867
USPC .......................................................... 707/754
See application file for complete search history.

(56) References Cited

U.S. PATENT DOCUMENTS

| 6,483,523 B1 * | 11/2002 | Feng .............................. 715/745 |
| 6,845,354 B1 * | 1/2005 | Kuo et al. ......................... 704/9 |
| 7,457,728 B2 * | 11/2008 | Chen et al. .................... 702/189 |
| 2010/0010993 A1 | 1/2010 | Hussey et al. |

(Continued)

FOREIGN PATENT DOCUMENTS

| CN | 102231188 A | 11/2011 |
| TW | 201001179 A | 1/2010 |
| TW | 201115371 A1 | 5/2011 |

OTHER PUBLICATIONS

Can Chen et at, MicroBlog recommendation based on user interaction, 2012, IEEE, 2107-2111.*

(Continued)

*Primary Examiner* — Jean B Fleurantin
(74) *Attorney, Agent, or Firm* — CKC & Partners Co., Ltd.

(57) ABSTRACT

A social data filtering system is provided. The social data filter system comprises a database, a retrieving module, a filtering module and a determining module. The database stores personal data and corresponding identification information. The retrieving module retrieves the personal data and the identification information corresponding to a designated person and generates search information accordingly to retrieve user information and corresponding social interaction information from a plurality of social data sources accordingly to the search information The filtering module performs filtering on the user information and the social interaction information according to the personal data to retrieve filtered information. The determining module determines at least one key word corresponding to the designated person according to the filtered information.

17 Claims, 5 Drawing Sheets

(56) References Cited

U.S. PATENT DOCUMENTS

2011/0125770 A1    5/2011  Battestini et al.
2014/0136635 A1*   5/2014  Jeng et al. .................... 709/206

OTHER PUBLICATIONS

The office action of the corresponding Chinese application issued on Dec. 20, 2016. All pages.

* cited by examiner

SOCIAL DATA FILTERING SYSTEM, METHOD AND NON-TRANSITORY COMPUTER READABLE STORAGE MEDIUM OF THE SAME

RELATED APPLICATIONS

This application claims priority to Taiwan Application Serial Number 102121561, filed Jun. 18, 2013, which is herein incorporated by reference.

BACKGROUND OF THE INVENTION

Technical Field

The present disclosure relates to a social data processing technology. More particularly, the present disclosure relates to a social data filtering system, method and non-transitory computer readable storage medium of the same.

Description of Related Art

When a corporation designs or introduces a new product, it is necessary for the corporation to understand the needs and the preferences of the clients and the trends of the market first to design the products that match the clients needs.

In the conventional method, when the corporation wants to promote a product to the clients or wants to understand the needs of the clients, the corporation gathers the preferences of the clients only based on the record data of business transactions and updates the customer relationship management (CRM) so as to determine the marketing plan. However, the detail of the needs of the clients may not be understood in the record data of the business transactions and purchase history. Furthermore, the preferences of the client may be changed in different time periods. The data of the business transactions and purchase history may be outdated and be not suitable to be used for marketing in the current or future.

Accordingly, what is needed is a social, data filtering system, method and non-transitory computer readable storage medium of the same to address the above issue.

BRIEF SUMMARY OF THE INVENTION

An aspect of the present disclosure is to provide a social data filtering system. The social data filtering system includes a database, a retrieving module, a filtering module and a determining module. The database stores a plurality pieces of personal data and a plurality pieces of corresponding identification information. The retrieving module is coupled to the database to retrieve one piece of the personal data and the identification information corresponding to a target person, and to generate a plurality pieces of search information according to the identification information corresponding to the target person for retrieving a plurality pieces of user information and at least one piece of corresponding social interaction information from a plurality of social data sources according to the plurality pieces of search information. The filtering module is coupled to the retrieving module to perform a filtering process on the plurality pieces of user information and the at least one piece of corresponding social interaction information according to the personal data of the target person for retrieving at least one piece of filtered information, wherein each piece of the filtered information is determined to be as the user information and the social interaction information corresponding to the target person. The determining module is coupled to the filtering module to determine at least one keyword corresponding to the target person according to the filtered information.

Another aspect of the present disclosure is to provide a social data filtering method that includes the steps outlined below. One of a plurality pieces of personal data and a plurality pieces of identification information corresponding to a target person are retrieved from the plurality of personal data and the plurality pieces of corresponding identification information stored in a database. A plurality pieces of search information are generated according to the plurality pieces of identification information corresponding to the target person. A plurality pieces of user information and at least one piece of corresponding social interaction information are retrieved from a plurality of social data sources according to the plurality pieces of search information. A filtering process is performed on the plurality pieces of user information and the at least one piece of corresponding social interaction information according to the personal data of the target person for retrieving at least one piece of filtered information, wherein each piece of the filtered information is determined to be as the user information and the social interaction information corresponding to the target person. At least one keyword is determined corresponding to the target person according to the filtered information.

Yet another aspect of the present disclosure is to provide a non-transitory computer readable storage medium to store a computer program to execute social data filtering method used in a social data filtering system. The social data filtering method includes the steps outlined below. One of a plurality pieces of personal data and a plurality pieces of identification information corresponding to a target person are retrieved from the plurality of personal data and the plurality pieces of corresponding identification information stored in a database. A plurality pieces of search information are generated according to the plurality pieces of identification information corresponding to the target person. A plurality pieces of user information and at least one piece of corresponding social interaction information are retrieved from a plurality of social data sources according to the plurality pieces of search information. A filtering process is performed on the plurality pieces of user information and the at least one piece of corresponding social interaction information according to the personal data of the target person for retrieving at least one piece of filtered information, wherein each piece of the filtered information is determined to be as the user information and the social interaction information corresponding to the target person. At least one keyword is determined corresponding to the target person according to the filtered information.

These and other features, aspects, and advantages of the present disclosure will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
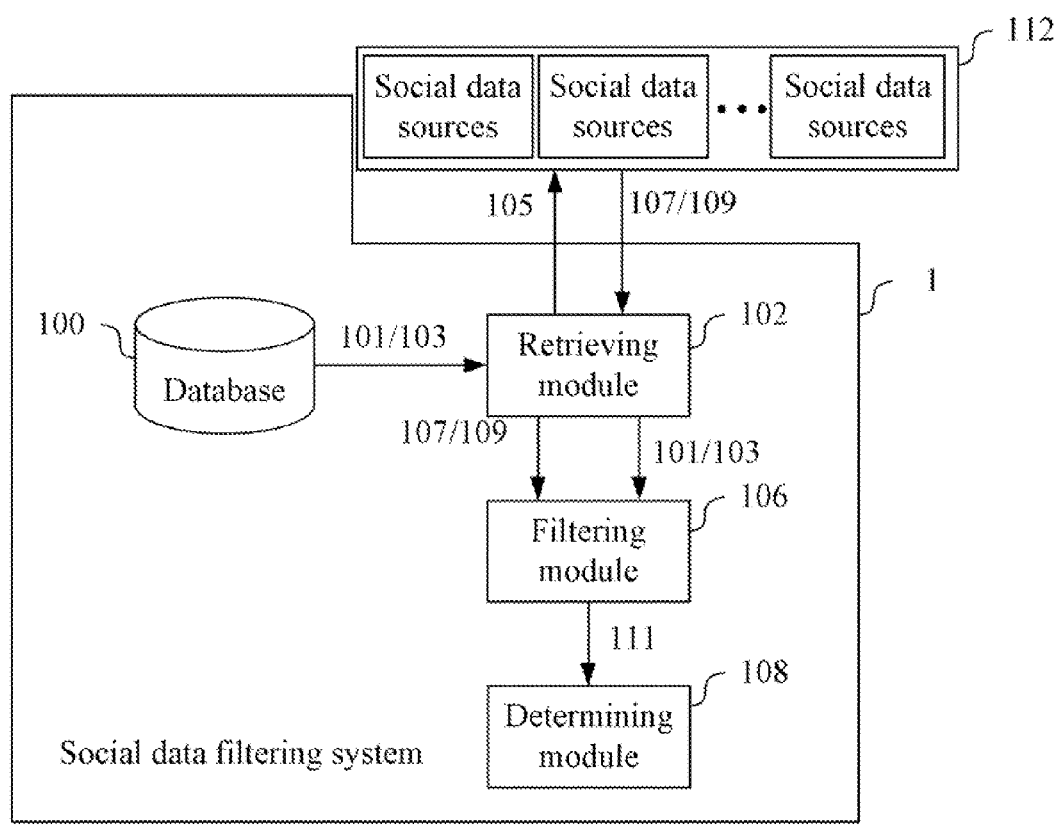
FIG. 1A is a block diagram of a social data filtering system in an embodiment of the present disclosure.

Reference will now be made in detail, to the present embodiments of the invention, examples of which are illustrated in the accompanying drawings. Wherever possible, the same reference numbers are used in the drawings and the description to refer to the same or like parts.

FIG. 1A is a block diagram of a social data filtering system 1 in an embodiment of the present disclosure. The social data filtering system 1 includes a database 100, a retrieving module 102, a filtering module 106 and a determining module 108.

The database 100 stores a plurality pieces of personal data 101 and a plurality pieces of corresponding identification information 103. In an embodiment, the database 100 can be a customer information database in a corporation for storing the plurality pieces of personal data 101 related to the clients. The plurality pieces of corresponding identification information 103 include the information of such as, but not limited to, Chinese names, English names, e-mail accounts, nicknames, addresses, occupations, attending organization, schools, birthdays, telephone numbers and records of consumption.

The retrieving module 102 is coupled to the database 100 to retrieve one piece of the personal data 101 and the corresponding identification information 103 corresponding to a target person (such as a specific client). For example, the target person can be retrieved by the retrieving module 102, either in order or randomly, or can be retrieved according to a selection input from a input module or operation interface (not illustrated) selectively equipped in the social data filtering system 1 operated by a user. The retrieving module 102 thereby retrieves the related information from the database 100 according the user input. In some embodiments, the input module or the operation interface can be a keyboard, a mouse, a touch panel, a microphone, an application program interface, a human-computer interaction interface or a combination of at least two of the above.

The retrieving module 102 further generates a plurality pieces of search information 105 according to the identification information 103. The plurality pieces of search information 105 are used in a plurality of social data sources, such as the source data sources 112 depicted in FIG. 1A, for retrieving a plurality pieces of user information 107 and at least one piece of corresponding social interaction information 109 thereof. The number of the social data sources varies in different embodiments. The social data sources include such as, but not limited to the server/the database of Facebook, Twitter, Plurk, Google+ and Youtube or the information related to online shopping, blog, m croblog, forum and friends of websites, such as Yahoo, Sins and Sohu.

In some embodiments, the retrieving module 102 uses a part of or a combination of a part of the identification information 103 mentioned above (e.g. Chinese names, English names, e-mail accounts, nicknames) to generate the plurality pieces of search information 105, and further searches the data the is partially or completely matched in the social data source 112. According to the plurality of pieces search information 105, the plurality pieces of user information 107 (such as the user information of the user including personal data or registration data recorded by the social platform) are retrieved from these social data sources 112. In some embodiments, the retrieved pieces of user information 107 are partially similar to, partially matched or completely matched with the Chinese names, English names, e-mail accounts, nicknames, addresses, occupations, attending organization, schools, birthdays, telephone numbers and records of consumption included in the pieces of identification information 103. The piece of corresponding social interaction information 109 can be the published message, the clicking of the like button, the history information of online shopping, the history information of the network browsing, the social relation information, the history information of geometry movement or a combination of the above. The piece of corresponding social interaction information 109 can further include the time information corresponding to the information mentioned above. For example, the piece of corresponding social interaction information 109 can include the time at which the message be published or be browsed.

For example, a piece of personal data 101 for a user "Lee Ai-Guo" stored in the database 100, and the corresponding identification information 103 includes the birthday of Dec $23^{rd}$ the English name of Tom, the address of Taipei, and the e-mail account of leeguo@gmail.com. The pieces of user information stored in different social data sources may not be the same. In other words, it is possible that the types or the fields of data recorded in each of the social data sources may be different. The retrieving module 102 retrieves the pieces of user information 107 of a plurality of users from a multiple of social data, and retrieve the corresponding social interaction information 109 of each of the plurality of users from a multiple of social data sources such that these pieces of information are stored. The pieces of retrieved user information 107 may include the retrieved source for the data, the name, the age, the residing city, the graduated school of the user. The pieces of retrieved corresponding social interaction information 109 may include the friends, the published messages and the actions of likes of the user. The retrieved data can be stored in different formats such as in a single table, in a multiple of related tables, or in a recorded file. The filtering module 106 is coupled to the retrieving module 102 to perform a filtering process on the plurality pieces of user information 107 and the piece of corresponding social interaction information 109 according to the personal data 101 of the target person for retrieving at least one piece of filtered information 111.

Figure 1B:
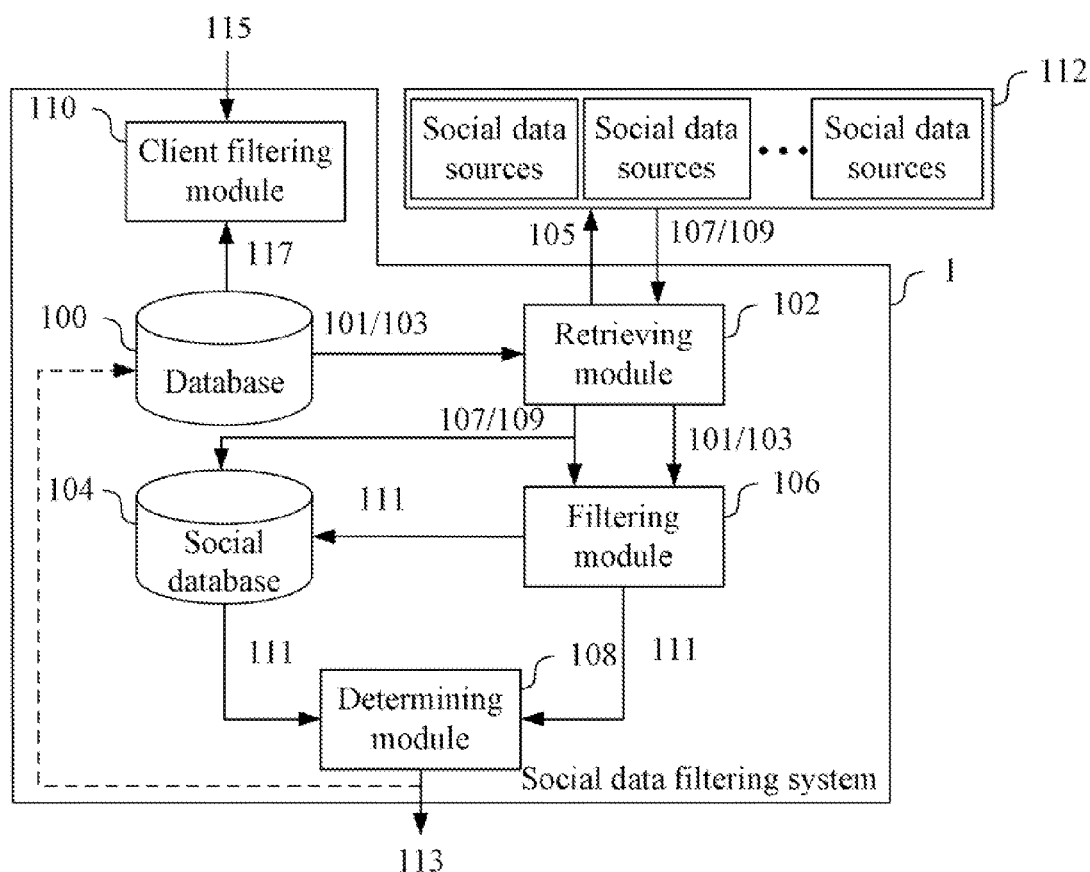
FIG. 1B is a block diagram of the social data filtering system in an embodiment of the present disclosure.

FIG. 1B is a block diagram of the social data filtering system 1 in another embodiment of the present disclosure. Besides the elements similar to those in FIG. 1A, the social data filtering system 1 in FIG. 1B further include a social database 104 and a client filtering module 110. The social data filtering system 1 can include the social database 104 or be linked to the social database 104 external to the social data filtering system 1. The social database 104 is therefore linked to the retrieving module 102 and the filtering module 106. The social database 104 stores the pieces of user information 107 and the corresponding social interaction information 109 retrieved by the retrieving module 102, and provides the stored information to the filtering module 106. Hence, the filtering module 106 can directly obtain the pieces of user information 107 and the corresponding social interaction information 109 from the retrieving module 102 or indirectly obtain the pieces of user information 107 and the corresponding social interaction information 109 from the social database 104.

In the embodiments in FIG. 1A and FIG. 1B, the filtering module 106 performs the filtering process to generate the piece of filtered information 111. The piece of filtered information includes the pieces of user information 107 and the social interaction information 109 that are determined to be corresponding to the target person. The descriptions of the detail architecture and the filtering process of the filtering module 106 are presented in the following paragraphs. Furthermore, in an embodiment, the piece of filtered information 111 generated by the filtering module 106 is displayed by the selectively disposed display module or the operation interlace (not shown) of the social data filtering system 1. A piece of confirming information is either further received from the input of the user or generated automatically by the social data filtering system 1 when the piece of filtering information 111 matches the information used for verification. The filtering module 106 determines if the confirmed filtered information 111 is qualified after the reception of the piece of filtering information 111 and the piece of confirming information. The accuracy of the filtering information 111 is increased.

The determining module 108 is coupled to the filtering module 106 determines at least one keyword 113 corresponding to the target person according to the filtered information 111. The keyword may be the information of the preference, the need, the tendency of shopping, the concerned topics, or the interested objects of the target person. Hence, the corporation can figure out the product information that the clients want to know according to the determined keyword 113 to design the marketing strategy or perform promotion by selecting the appropriate clients.

In another embodiment, each piece of social interaction information 109 retrieved by the retrieving module 102 can further include the corresponding time information, such as the time of the published social interaction information 109 or the time mentioned in the social interaction information 109. The determining module 108 further determines the keyword 113 corresponding to the target person and a designated time according to the filtered information 111 and designated time information. For example, when the designated time information is "within a year", the determining module 108 searches for the piece of corresponding social interaction information 109 having the time information within a year (whether the published time of the corresponding social interaction information 109 or time mentioned in the contents of the corresponding social interaction information 109) before the search date. Moreover, the keyword 113 is determined according to the target person and the designated time information such that the accuracy of the determination is not affected by the outdated information.

In yet another embodiment, the determining module 108 is selectively linked to the database 100 to store the keyword 113 corresponding to the target person to serve as the data of the keyboard 113 of the personal data 101 corresponding to the target person, or to update the original data of the keyword 113 in the database 100. The client filtering module 110 linked to the database 100 receives the filtered client data 115 by the input module selectively disposed in the social data filtering system 1 to filter out at least one target person 117 corresponding to the filtered client data 115 according to the personal data 101 and the data of the corresponding keyword 113 in the database 100.

Figure 2:
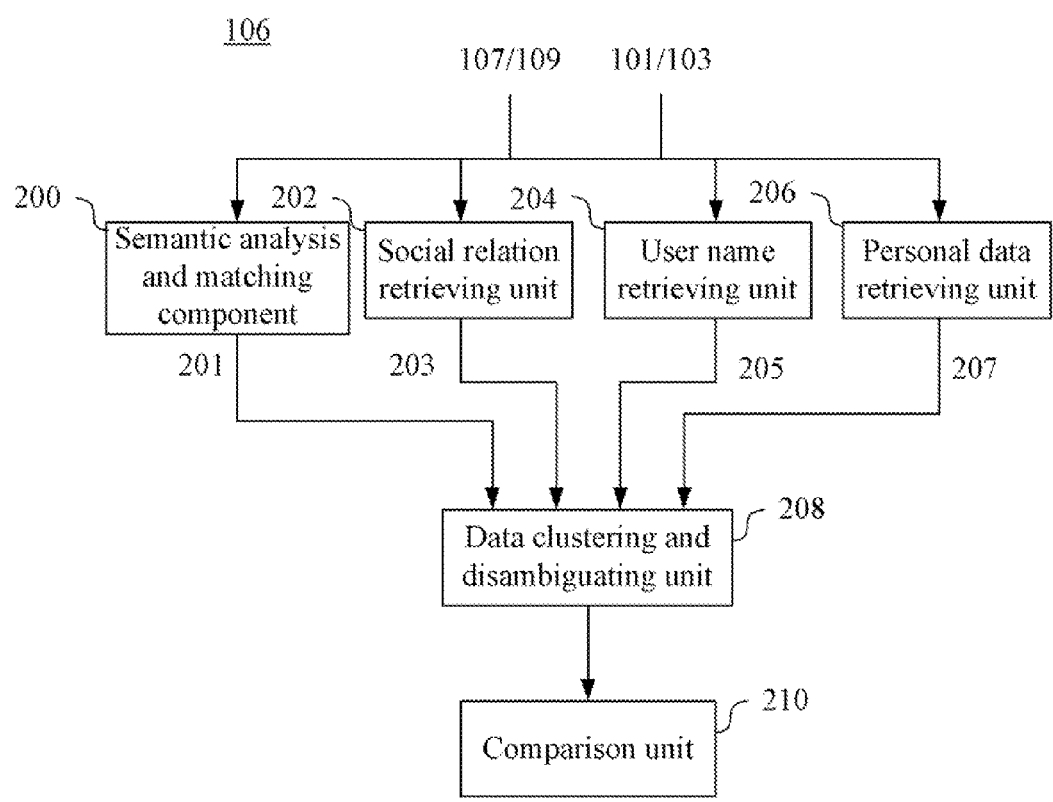
FIG. 2 is a detailed block diagram of the filtering module in an embodiment of the present disclosure.

Moreover, the filtering module 106 generates the piece of filtered information 111 according to the technologies of semantic analysis; social relation retrieving, data clustering and disambiguating process and hybrid comparison. FIG. 2 is a detailed block diagram of the filtering module 106 in another embodiment of the present disclosure. In the present embodiment, the filtering module 106 further includes one of a semantic analysis and matching component 200, a social relation retrieving unit 202, a user name retrieving unit 204, a personal data retrieving unit 206, a data clustering and disambiguating unit 208, and a comparison unit 210, or includes a combination of any two unit mentioned above. The social relation retrieving unit 202, the user name retrieving unit 204 and the personal data retrieving unit 206 respectively receive personal data 101, the pieces of identification information 103, the pieces of user information 107 and the piece of social interaction information 109 to perform a related process.

Figure 3:
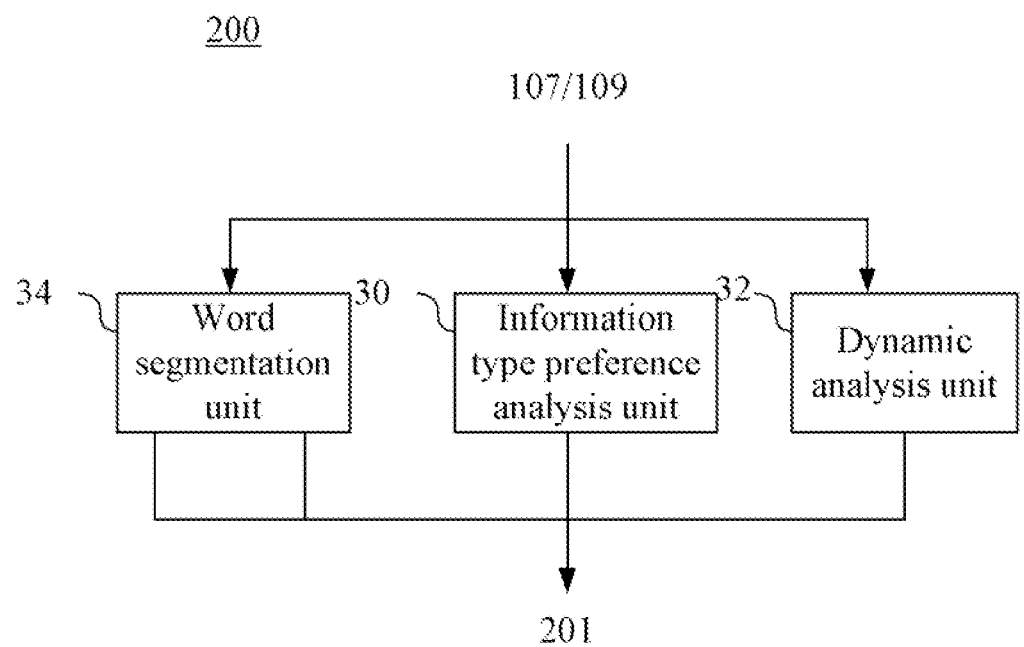
FIG. 3 is a detailed block diagram of the semantic analysis and matching component in an embodiment of the present disclosure.

The detail of the semantic analysis and matching component 200 is described below. FIG. 3 is a detailed block diagram of the semantic analysis and matching component 200 in an embodiment of the present disclosure. The semantic analysis and matching component 200 performs semantic analysis and matching process on the piece of social interaction information 109 corresponding to the pieces of the user information 107. In the present embodiment, the semantic analysis and matching component 200 includes an information type preference analysis unit 30, a dynamic analysis unit 32 and a word segmentation unit 34.

The information type preference analysis unit 30 performs an information type analysis on the pieces of the social interaction information 109. For example, the interaction information is distinguished into one of the following format: a text format, a video/audio format or a still image format. The dynamic analysis unit 32 performs a time analysis and a location analysis on the pieces of social interaction information 109. For example, the dynamic analysis unit 32 determines the time and the location of the published message according to the time stamp and the source network address.

The word segmentation unit 34 performs a relation analysis and a keyword detection on the pieces of social interaction information 109. For example, the word segmentation unit 34 segments the texts in the pieces of social interaction information 109 into a plurality of words or vocabularies to further analyze the time relation and the location relation of these words or vocabularies and the frequencies of the words or vocabularies that appear singularly or together. According to the analysis mentioned above, the semantic analysis and matching component 200 generates the time relation values, the geometrical relation values and the textual relation values and generates a behavioral relation value 201 of the social interaction information 109 corresponding to each pieces of the user information 107 according to the statistics of the relation values mentioned above.

The information type preference analysis unit 30, the dynamic analysis unit 32 and the word segmentation unit 34 perform analysis on the retrieved social interaction information mentioned above. For example, the content of the message published by the user can be analyzed to get the text format, the published time, and the keyword. When the keyword is "BWM", all the texts in the published message are analyzed to search those that include "BWM". The published messages are neglected when they are outdated.

The social relation retrieving unit 202 retrieves a piece of social relation information 203 from each piece of the user information 107 and the corresponding social interaction information 109 for each piece of the user information 107. The piece of social relation information 203 can be such as, but not limited to the information of the friends of the user or the target that the user uses the published message to communicate with in the social network.

The social relation retrieving unit 202 can get the related piece of social relation information 203 by performing analysis on the social interaction information, such as the data of the friends of the user. In an embodiment, besides the data of friends of the user, the social relation retrieving unit 202 can further use the data of friends of the friends of the user as the data source to accomplish a complex analysis on the social relation.

The user name retrieving unit 204 retrieves a user name of the plurality pieces of the user information 107 for performing a hybrid comparison with the identification information 103 of the target person. The user name can include the information of such as, but not limited to the Chinese name, the English name, the nickname and the account of the e-mail. The hybrid comparison mentioned above is to retrieve any identification information 103 that is able to identify a person such as the name, the telephone number, the e-mail account by the user name retrieving unit 204, such that a comparison related to different spellings, partial spellings, prefix, suffix, synonym or a combination of the above of the characters is made to generate a hybrid comparison result 205. Different parts of the identification information 103 can be decomposed or composed such that the hybrid comparison is performed according to partial or complete contents of the identification information 103.

The personal data retrieving unit 206 retrieves the individual data 207 in the user information. The individual data 207 may include such as, but not limited to the address, the occupation, the attending organization, the graduated or attending school, the birthday and the telephone number of the user.

The data clustering and disambiguating unit 208 performs the data clustering and disambiguating process according to the individual data 207, the behavioral relation value 201 and the hybrid comparison result 205. The data clustering and disambiguating unit 208 can use conventional data clustering and disambiguating technologies. For example, the clustering technologies may include K-means method, Nelder-Mead method or particle swarm optimization method. The disambiguating technologies may include decision tree method, the maximum entropy method, data disambiguating method or other methods to determine whether the pieces of data are the same or are different.

The comparison unit 210 performs comparison according to the information mentioned above. For example, the comparison unit 210 compares the individual data 207 and hybrid comparison result 205 with the personal data 201 first to filter out the possible candidate persons. Subsequently, the comparison unit 210 searches at least two groups of social relation information 203 having a value of similarity larger than a similarity threshold after the data clustering and disambiguating process performed on the social relation information 203. The comparison unit 210 further determines at least two groups of user information 107 correspond to the candidate person, and further compares the personal data 101 of the target person and the user information 107 of the candidate person to determine whether the user information 107 and the social interaction information 109 corresponding to the candidate person is the filtered information 111.

The comparison unit 210 further searches the user information 107 that corresponds to the social interaction information 109 having the behavioral relation value 201 larger than a behavioral relation threshold to determine the user information 107 corresponds to a candidate person. The comparison unit 210 further compares the personal data of the target person and all the user information 107 of the candidate person to determine whether the user information 107 and the social interaction information 109 corresponding to the candidate person is the filtered information 111.

The comparison unit 210 performs hybrid comparison between the pieces of user data (e.g. the data including Lee Ai-Guo, Tom Lee, AiKuoLee, AiGuoLee and Tom1223) retrieved from the social data sources and the personal data 101 (e.g. Lee Ai-Guo, Tom, leeguo and birthday) in the database 100 and exclude the pieces of user data that are much different from the personal data, such as AiKuoLee. The comparison unit 210 can also determine the behavioral relation value of the published messages, such as the messages having similar published time and similar topics, to further determine that the user information 107 corresponding to these pieces of social interaction information 109 correspond to the candidate person. The comparison unit 210 further compares the personal data 101 of the target person and all the user information 107 of the candidate person to further determine the user information 107 that can be served as the filtered information 111.

After the filtered information 111 is generated, the determining module 108 determines the keyword 113 corresponding to the target person. Take the embodiment mentioned above as an example, the keyword 113 can be such as "BMW", Consequently, the social data filtering system 1 of the present disclosure retrieves user information and social interaction information rapidly according to the personal data and the identification information in the database. The social data filtering system 1 further performs various analysis and comparisons to determine the matched information and keyword to obtain the information of the preferences and the concerned topics of the person with greater efficiency and accuracy.

Figure 4:
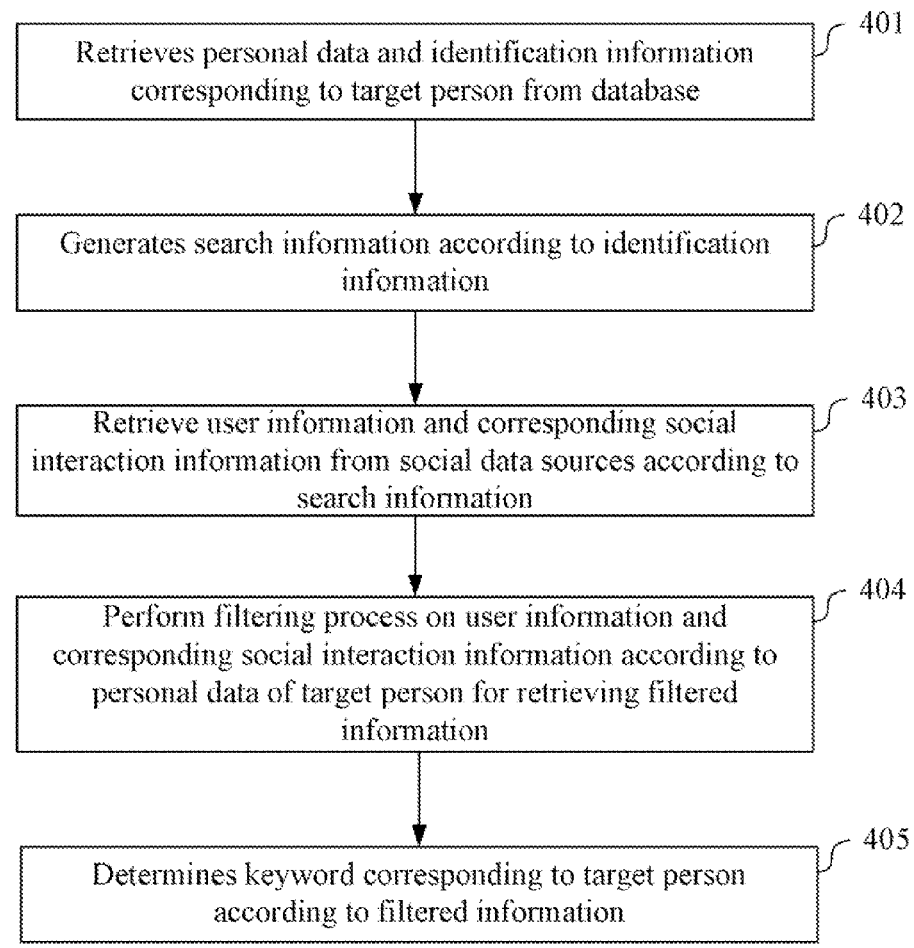
FIG. 4 is a flow chart of a social data filtering method in an embodiment of the present disclosure.

FIG. 4 is a flow chart of a social data filtering method 400 in an embodiment of the present disclosure. The social data filtering method 400 can be used in the social data filtering system 1 illustrated in FIG. 1. More specifically, the social data filtering method 400 is implemented by using a computer program to control the modules in the social data filtering system 1. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The social data filtering method 400 comprises the steps outlined below. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the retrieving module 102 retrieves one of the pieces of personal data 101 and the pieces of identification information 103 corresponding to a target person from the database 100.

In step 402, the retrieving module 102 generates the search information according to the identification information 103.

In step 403, the retrieving module 102 retrieves the pieces of user information 107 and the piece of corresponding social interaction information 109 from the social data sources (e.g. the social data source 112 in FIG. 1) according to the search information 105.

In step 404, the filtering module 106 performs filtering process on the user information 107 and the corresponding social interaction information 109 according to the personal data 101 of the target person for retrieving filtered information 111, wherein each piece of the filtered information 111 is determined to be as the user information 107 and the social interaction information 109 corresponding to the target person. At least one keyword is determined corresponding to the target person according to the filtered information.

In step 405, the determining module 108 determines the keyword 113 corresponding to the target person according to the filtered information 111.

The detail of the technologies and embodiments of the method can be understood by referencing the description of the social data filtering system 1 and the related embodiments. Accordingly, no further detail is discussed herein.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A social data filtering system disposed in a computer comprising:
    a database in the computer to store a plurality pieces of personal data and a plurality pieces of corresponding identification information; and
    a processor coupled to the database comprises:
        a retrieving module to retrieve one piece of the personal data and the identification information corresponding to a target person in the database, and to generate a plurality pieces of search information according to the identification information corresponding to the target person for retrieving a plurality pieces of user information and at least one piece of corresponding social interaction information from a plurality of social data sources according to the plurality pieces of search information;
        a filtering module coupled to the retrieving module to perform a filtering process on the plurality pieces of user information and the at least one piece of corresponding social interaction information according to the personal data of the target person for retrieving at least one piece of filtered information, wherein each piece of the filtered information is determined to be as the user information and the social interaction information corresponding to the target person; and
        a determining module coupled to the filtering module to determine at least one keyword corresponding to the target person according to the filtered information.

2. The social data filtering system of claim 1, further comprising a social database coupled to the retrieving module and the filtering module to store the retrieved user information and the at least one piece of corresponding social interaction information by the retrieving module, and to provide the stored information to the filtering module for performing the filtering process.

3. The social data filtering system of claim 1, wherein each piece of the retrieved at least one piece of corresponding social interaction information further comprises a corresponding piece of time information; and the determining module further determines the at least one keyword corresponding to the target person and a piece of designated time information according to the filtering information and the designated time information.

4. The social data filtering system of claim 1, wherein the filtering module further comprises a semantic analysis and matching component to perform a semantic analysis and matching process on the at least one piece of social interaction information corresponding to the user information during the filtering process performed by the filtering module for generating a behavioral relation value among the social interaction information of each of the piece of the user information, wherein the behavioral relation value is generated according to a time relation value, a location relation value and a wording relation value; and wherein the filtering module searches for one piece of the user information corresponding to the social interaction information that has the behavioral relation value larger than a threshold of the behavioral relation value, which is used to determine if corresponding to a candidate person, and compares the personal data of the target person with all the user information of the candidate person to determine whether the user information and the social interaction information corresponding to the candidate person is the at least one piece of filtered information.

5. The social data filtering system of claim 4, wherein the filtering module further comprises:
    a user name retrieving unit to retrieve a user name of the plurality pieces of the user information for performing a hybrid comparison with the identification information of the target person;
    a personal data retrieving unit to retrieve an individual data of the plurality pieces of the user information; and
    a data clustering and disambiguating unit to perform the data clustering and disambiguating process according to the individual data, the behavioral relation value and a result of the hybrid comparison.

6. The social data filtering system of claim 4, wherein the semantic analysis and matching component further comprises:
    an information type preference analysis unit to perform an information type analysis on the plurality pieces of the social interaction information;
    a dynamic analysis unit to perform a time analysis and a location analysis on the plurality pieces of the social interaction information; and
    a word segmentation unit to perform a relation analysis and a keyword detection on the plurality pieces of the social interaction information.

7. The social data filtering system of claim 1, wherein the filtering module further comprises a social relation retrieving unit to retrieve a piece of social relation information from each piece of the user information and the corresponding social interaction information for each piece of the user information; and
    the filtering module further searches for at least two group of the user information in which a similarity value calculated according to the at least two group is larger than a similarity threshold according to the user information and the corresponding social relation information, use the user information of the at least two group to determine if corresponding to a candidate person, and compares the personal data of the target person with all the user information of the candidate person to determine whether the user information and the social interaction information corresponding to the candidate person is the at least one piece of filtered information.

8. The social data filtering system of claim 7, wherein the filtering module further performs a data clustering and disambiguating process before comparing the personal data of the target person and the user information corresponding to the candidate person to determine whether the user information and the social interaction information corresponding to the candidate person is the at least one piece of filtered information, such that the user information and the social interaction information is determined to be the filtered information after the data clustering and disambiguating process.

9. A social data filtering method used in a computer comprising:
retrieving, by a processor in the computer, one of a plurality pieces of personal data and a plurality pieces of identification information corresponding to a target person from the plurality of personal data and the plurality pieces of corresponding identification information stored in a database in the computer;
generating, by the processor, a plurality pieces of search information according to the plurality pieces of identification information corresponding to the target person;
retrieving, by the processor, a plurality pieces of user information and at least one piece of corresponding social interaction information from a plurality of social data sources according to the plurality pieces of search information;
performing, by the processor, a filtering process on the plurality pieces of user information and the at least one piece of corresponding social interaction information according to the personal data of the target person for retrieving at least one piece of filtered information, wherein each piece of the filtered information is determined to be as the user information and the social interaction information corresponding to the target person; and
determining, by the processor, at least one keyword corresponding to the target person according to the filtered information.

10. The social data filtering method of claim 9, further comprising storing the retrieved user information and the at least one piece of corresponding social interaction information to a social database, and providing the stored information to the filtering module for performing the filtering process.

11. The social data filtering method of claim 9, wherein each piece of the retrieved at least one piece of corresponding social interaction information further comprises a corresponding piece of time information; and the step of determining the at least one keyword further comprises determining the at least one keyword corresponding to the target person and a piece of designated time information according to the filtering information and the designated time information.

12. The social data filtering method of claim 9, wherein the step of retrieving the filtered information further comprises:
performing a semantic analysis and matching process on the at least one piece of social interaction information corresponding to the user information during the filtering process for generating a behavioral relation value among the social interaction information of each of the piece of the user information, wherein the behavioral relation value is generated according to a time relation value, a location relation value and a wording relation value;
searching for one piece of the user information corresponding to the social interaction information that has the behavioral relation value larger than a threshold of the behavioral relation value, which is used to determined if corresponding to a candidate person;
comparing the personal data of the target person with all the user information of the candidate person; and
determining whether the user information and the social interaction information corresponding to the candidate person is the at least one piece of filtered information.

13. The social data filtering method of claim 12, wherein the step of retrieving the filtered information further comprises:
retrieving a user name of the plurality pieces of the user information for performing a hybrid comparison with the identification information of the target person;
retrieving an individual data of the plurality pieces of the user information; and
performing the data clustering and disambiguating process according to the individual data, the behavioral relation value and a result of the hybrid comparison.

14. The social data filtering method of claim 12, wherein the semantic analysis and matching process comprises an relation analysis, a keyword detection, an information type analysis, a time analysis, a location analysis or a combination of the above.

15. The social data filtering method of claim 9, wherein the step of retrieving the filtered information further comprises:
retrieving a piece of social relation information from each piece of the user information and the corresponding social interaction information to correspond for each piece of the user information;
searching for at least two group of the user information in which a similarity value calculated according to the at least two group is larger than a similarity threshold according to the user information and the corresponding social relation information;
using the user information of the at least two group to determine if corresponding to a candidate person;
comparing the personal data of the target person with all the user information of the candidate person; and
determining whether the user information and the social interaction information corresponding to the candidate person is the at least one piece of filtered information.

16. The social data filtering method of claim 15, wherein the step of retrieving the filtered information further comprises:
performing a data clustering and disambiguating process before comparing the personal data of the target person and the user information corresponding to the candidate person to determine whether the user information and the social interaction information corresponding to the candidate person is the at least one piece of filtered information, such that the user information and the social interaction information is determined to be the filtered information after the data clustering and disambiguating process.

17. A non-transitory computer readable storage medium to store a computer program to execute a social data filtering method by a computer, wherein the object-sharing method comprises:

retrieving one of a plurality pieces of personal data and a plurality pieces of identification information corresponding to a target person from the plurality of personal data and the plurality pieces of corresponding identification information stored in a database in the computer;

generating, by a processor in the computer, a plurality pieces of search information according to the plurality pieces of identification information;

retrieving, by the processor, a plurality pieces of user information and at least one piece of corresponding social interaction information from a plurality of social data sources according to the search information;

performing by the processor, a filtering process on the plurality pieces of user information and the at least one social interaction information according to the personal data of the target person to retrieve at least one piece of filtered information, wherein each piece of the filtered information is determined to be as the user information and the social interaction information corresponding to the target person; and determining by the processor, at least one keyword corresponding to the target person according to the filtered information.

* * * * *